United States Patent [19]

Watson et al.

[11] 4,008,164
[45] Feb. 15, 1977

[54] PROCESS FOR SCALE INHIBITION

[75] Inventors: James D. Watson, Houston; James R. Stanford, Sugar Land, both of Tex.

[73] Assignee: Nalco Chemical Company, Oak Brook, Ill.

[22] Filed: Mar. 21, 1974

[21] Appl. No.: 453,215

[52] U.S. Cl. ............................. 252/8.55 B; 210/58; 252/8.55 D; 252/180; 260/485 R
[51] Int. Cl.$^2$ ......................................... C02B 5/06
[58] Field of Search ................. 252/8.55 B, 8.55 D, 252/180; 210/58

[56] References Cited

UNITED STATES PATENTS

| | | | |
|---|---|---|---|
| 2,718,497 | 9/1955 | Oldham et al. ...................... | 252/8.5 |
| 2,783,200 | 2/1957 | Crum et al. ...................... | 210/58 X |
| 3,514,376 | 5/1970 | Salutsky .......................... | 210/58 X |
| 3,549,538 | 12/1970 | Jacklin ............................ | 210/58 X |
| 3,597,352 | 8/1971 | Stanford et al. ................... | 252/8.55 |
| 3,663,448 | 5/1972 | Ralston .......................... | 252/8.55 X |
| 3,756,257 | 9/1973 | Rice et al. ...................... | 252/8.55 X |
| 3,766,077 | 10/1973 | Hwa et al. ........................ | 252/180 |
| 3,904,685 | 9/1975 | Shahidi et al. ................... | 252/109 X |

*Primary Examiner*—Herbert B. Guynn
*Attorney, Agent, or Firm*—Johnston, Keil, Thompson & Shurtleff

[57] ABSTRACT

Copolymers of acrylic acid and methyl acrylate are prepared which are stable against precipitation in waters containing calcium even at a pH of 10 and at elevated temperatures and are especially useful in inhibiting the deposition of calcium from waters containing calcium, in underground formations, in cooling waters and other processes where it is desirable to prevent calcium deposits on metal surfaces or other surfaces in contact with water containing calcium.

4 Claims, No Drawings

PROCESS FOR SCALE INHIBITION

BACKGROUND

It is well known that natural waters and those found in underground formations contain hardness scale forming ions such as calcium which tend to precipitate and form deposits or scale. Thus, when such waters are used as cooling waters in cooling towers in many industrial processes there is a tendency for scale to be deposited and eventually it is necessary to remove such scale which in turn makes it necessary to discontinue operation of the particular process for a period of time until the scale can be removed.

The formation of insoluble calcium salts is also a problem in the secondary recovery of oil from subterranean formations by processes in which water is introduced into injection wells and forced through the underground formations to cause oil to be produced in a producing well. This type of process is usually referred to as a waterflood system.

In processes of the foregoing type where it is desired to prevent hardness scale deposits on metal surfaces or other surfaces in contact with hard water containing hardness scale forming ions such as calcium, it has been customary heretofore to add various types of scale inhibiting compounds including inorganic polyphosphates, organic phosphates, organic phosphonates, and some types of polyacrylates. These compounds have varying degrees of effectiveness and some of them are quite effective as scale inhibitors for the prevention of scale deposits in underground formations. Many of them, however, are not effective at a pH as high as 10 or under elevated temperature conditions. This is due to the fact that the compounds themselves are not stable against precipitation in waters containing as much as 5,000 mg/l calcium, calculated as calcium carbonate, at a pH of 10 and at temperatures of 160° F or higher. Obviously, if the scale inhibiting compound itself precipitates from solution it will form a deposit which adds to the scale problem and in the case of waterflooding, water cooling or other processes where hard waters containing calcium are used, the compound will no longer be present in amounts sufficient to perform the desired function of inhibiting scale formation.

OBJECTS

One of the objects of the present invention is to provide a new and improved process of inhibiting calcium deposition from waters containing calcium including cooling waters and waters in underground formations such as waterflood systems used in the secondary recovery of oil wherein a scale inhibiting compound is employed which itself is unusually stable against precipitation by the calcium normally present in such waters even at a relatively high pH and at elevated temperatures.

A more specific object of the invention is to provide a new and improved process for inhibiting the deposition of calcium compounds in a waterflood system in which water is added to one or more injection wells in order to force oil from underground formations to one or more producing wells.

Another specific object of the invention is to provide a new and improved process of inhibiting the deposition of calcium compounds from cooling waters containing such compounds.

A further object of the invention is to provide new and useful compositions which are stable against being precipitated by calcium when added to waters containing calcium compounds. Other objects will appear hereinafter.

BRIEF SUMMARY OF THE INVENTION

In accordance with the invention it has been found that certain copolymers of acrylic acid and methyl acrylate are effective as scale inhibitors in waters containing calcium compounds and are unusually stable against precipitation by calcium ions normally found in such waters. These copolymers have a relatively low molecular weight, e.g., 3,000 to 20,000, preferably 6,000 to 8,000 and are prepared by copolymerizing acrylic acid and methyl acrylate using a molar excess of acrylic acid over methyl acrylate of at least 3:1 and usually within the range of 4:1 to 5:1. The resultant copolymers are stable against precipitation at 1% by weight dosage in 5000 mg/1 calcium, calculated as $CaCO_3$, 5% by weight sodium chloride brine at a pH of 10 and a temperature of 160° F. for one hour. This calcium stability is an unusual property which is not possessed by many other types of scale inhibitors commonly employed to inhibit scale in waterflooding systems and other processes. This property, coupled with the fact that these copolymers are also effective in inhibiting scale formation attributable to the presence of calcium ions in water, makes it possible to provide improved protection against scale formation in a number of different types of processes where scaling occurs on metal surfaces or other surfaces in contact with waters containing calcium carbonate and calcium sulfate.

DETAILED DESCRIPTION OF THE INVENTION

A copolymer of acrylic acid and methyl acrylate can be prepared in accordance with the invention by a simple one-step reaction using ammonium persulfate as a catalyst and thioglycolic acid as a reducing agent for the catalyst and as the chain transfer agent. Water, acrylic acid, methyl acrylate and thioglycolic acid are added to a reaction chamber which is then cooled. With the reaction mixture at 15° C. to 25° C. and with full cooling the catalyst is added. After a shortened induction period of from 30 seconds to 3 minutes a strong exotherm indicates the polymerization is in progress. After 3 to 5 more minutes the polymerization is complete and sufficient sodium hydroxide is added to neutralize the solution.

The compositions of the invention were evaluated by scale inhibition tests and by calcium stability tests. Various types of test waters were used at various temperatures and with different dosages of the chemical.

The invention will be further illustrated but is not limited by the following examples in which the quantities are stated in parts by weight unless otherwise indicated.

EXAMPLE I

Using the previously described procedure a copolymer of acrylic acid and methyl acrylate, hereinafter called Product A, was prepared from 23.08 parts acrylic acid, 48.46 parts water, 6.15 parts methyl acrylate, 2.31 parts thioglycolic acid, a solution of 1.54 parts ammonium persulfate $((NH_4)_2S_2O_8)$ in 3.07 parts water and 15.38 parts of 50% sodium hydroxide solution in water. This product had the following physical properties:

| | |
|---|---|
| Color | Light yellow to water white |
| Odor | Sharp |
| Pour point | 16° F. |
| Flash point | >120° F. |
| pH | 4.8 |
| Viscosity | Approximately 62 centipoises |
| Specific Gravity | 1.18 |
| Density | 9.83 pounds/gallon |
| Solubility | Soluble in fresh water and brines. Insoluble in hydrocarbons |

EXAMPLE II

Using the previously described process a copolymer of acrylic acid and methyl acrylate (hereinafter called Product B) was prepared by reacting 20.77 parts acrylic acid and 5.54 parts methyl acrylate in 43.61 parts water containing 2.08 parts thioglycolic acid, with the addition as a catalyst of a solution of 1.39 parts ammonium persulfate in 2.77 parts water followed by neutralization with 13.84 parts of 50% sodium hydroxide solution in water and the addition of 10 parts methanol which was added for the purpose of reducing the pour point.

This product had the following physical properties:

| | |
|---|---|
| Color | Light yellow to water white |
| Odor | Sharp |
| Pour point | −14° F. |
| Flash point | >120° F. |
| pH | 5.1 |
| Viscosity | Approximately 40 centipoises |
| Specific gravity | 1.15 |
| Density | 9.58 pounds/gallon |
| Solubility | Soluble in fresh water and brines. Insoluble in hydrocarbons. |

EXAMPLE III

Calcium stability tests were carried out with Product A using a 5% sodium chloride brine at a temperature of 160° F. with the addition of 1% of Product A and various amounts of calcium, as calcium carbonate. The 5% sodium chloride brines containing various amounts of calcium and 1% of the chemicals under test were heated in a 160° F. water bath for at least one hour. Then while stirring and monitoring the pH of the solution with a pH meter, the pH of each solution was raised using sodium hydroxide solution until the solution became slightly cloudy or hazy. The pH at which a slight haze or cloud developed was called the "cloud point" and this point was taken as the point at which the solution became unstable.

By using this procedure Product A, at a concentration of calcium of 4000 mg/l, calculated as calcium carbonate, had a cloud point at pH 10.9. At a concentration of 5000 mg/l of calcium, as calcium carbonate, the cloud point of the solution containing 1% chemical was 10.2. At a concentration of 7000 mg/l calcium, calculated as calcium carbonate, the cloud point of the solution containing 1% chemical was 6.1.

In comparative tests with other types of scale inhibitors, the cloud point of a polyacrylic acid polymer was at a pH of only 4.2 at a concentration of 4000 mg/l of calcium, as calcium carbonate, at the same dosage of chemical. The cloud point of a phosphate ester scale inhibiting agent in a brine containing 5000 mg/l of calcium, as calcium carbonate, and a dosage of 1% chemical was at a pH of only 6.3. The cloud point of an organic phosphonate type scale inhibitor in a brine solution of the type described containing only 1000 mg/l of calcium, as calcium carbonate, was at a pH of 5.0.

EXAMPLE IV

A brine was prepared by dissolving 12,160 mg of $CaCl_2.2H_2O$, 3680 mg of $MgCl_2.2H_2O$, and 66000 mg of NaCl in one liter of distilled water. This brine was then saturated with $CO_2$ and the cloud point pH with the addition of 1% of various chemicals was determined at room temperature (75° F.). This solution containing 1% of Product A had a pH of 10.3 at the cloud point which was substantially higher than the cloud point pH of other scale inhibiting chemicals tested. One of the other scale inhibiting chemicals tested which was a phosphate ester, had a cloud point at a pH of 5.3. Another phosphate ester had a cloud point at a pH of 6.4. A third phosphate had a cloud point at a pH of 8.3. A polyacrylic acid polymer had a cloud point at a pH of 3.5. Another polyacrylate had a cloud point at a pH of 5.9 and two different organic phosphonate commercial scale inhibitors had cloud points at a pH of 4.9.

EXAMPLE V

In order to demonstrate the effectiveness of the compositions of the invention as scale inhibitors, tests were carried out using the following types of brines:

| | |
|---|---|
| Brine A | |
| 7,500 mg NaCl | per liter of distilled water |
| 11,100 mg $CaCl_2 . 2H_2O$ | |
| Brine B | |
| 7,500 mg NaCl | per liter of distilled water |
| 10,660 mg $Na_2SO_4$ | |
| Brine $A_1$ | |
| 11.58 gms $CaCl_2 . 2H_2O$ | per liter of distilled water |
| 3.164 gms $MgCl_2 . 6H_2O$ | |
| 20.59 gms NaCl | |
| Brine $B_1$ | |
| 2.082 gms $NaHCO_3$ | per liter of distilled water |
| 1.924 gms $Na_2SO_4$ | |
| Brine C | |
| 12,160 mg $CaCl_2 . 2H_2O$ | per liter of distilled water |
| 3,680 mg $MgCl_2 . 2H_2O$ | |
| 66,000 mg NaCl | |
| Brine D | |
| 7,360 mg $NaHCO_3$ | per liter of distilled water |
| 29 mg $Na_2SO_4$ | |
| 66,000 mg NaCl | |

Mixtures of Brine A and Brine B were used to test the compositions of the invention and compare them with other compositions in the inhibition of calcium sulfate deposition.

Mixtures of Brine C and Brine D were used to test the compositions of the invention as scale inhibitors in the inhibition of the deposition of calcium carbonate from brine solutions containing calcium carbonate. Brine C and Brine D were saturated with carbon dioxide just before they were used.

A test brine for calcium carbonate inhibition tests was prepared containing 50% of Brine C and 50% of Brine D. The test brine was placed in test cells which were kept at 160° F. for 20 hours after which the calcium contents were determined by titration with ethylene diamine tetraacetic acid. A blank or control containing no added chemical had a calcium and magnesium content of 4200 mg/l, calculated as CaCO₃, and a carbonate content of 4200 mg/l, calculated as CaCO₃, and a chlorine content of 72425 mg/l, calculated as NaCl, before precipitation. A blank after precipitation had a calcium and magnesium content of 2600 mg/l, calculated as calcium carbonate. Various amounts of Product A were added to the test brines and heated in the manner described to 160° F. for 20 hours in order to determine the amount which would be effective to retain 100% of the calcium carbonate in solution. It was found that the addition of 4 parts per million (ppm) of Product A was 67% effective, the addition of 5 ppm of Product A was 93% effective, and the addition of 6 ppm of Product A was 100% effective.

EXAMPLE VI

The calcium carbonate scale inhibition test was carried out at a temperature of 300° F. with 45 minute warm-up and a 3 hour test using a brine solution made by mixing Brine $A_1$ and Brine $B_1$ in equal proportions. The blank before precipitation contained 3600 mg CaCO₃/l and after precipitation 3300 mg CaCO₃/l. The addition of 200 ppm of Product A gave 67% retention of calcium carbonate and the addition of 400 ppm of Product A gave 100% retention of calcium carbonate.

EXAMPLE VII

In order to determine the effectiveness of the compositions of the invention in inhibiting calcium sulfate deposition, the test brine employed contained 50% of brine A and 50% of Brine B. The tests were carried out at 160° F. for 20 hours after which the calcium contents were determined. The blank before precipitation contained 5170 mg Ca/l, calculated as CaSO₄, 5170 mg SO₄/l, calculated as CaSO₄, and 11,950 mg Cl/l, calculated as NaCl. The blank after precipitation contained 3540 mg Ca/l, calculated as CaSO₄. Various quantities of Product A were added to the test solution in order to determine the amount that was effective in inhibiting the deposition of calcium sulfate and it was found that 0.8 ppm was 50% effective, 1.0 ppm was 75% effective and 1.25 ppm was 100% effective.

Comparable tests with product B showed similar results, in inhibiting deposition of calcium carbonate and calcium sulfate and mixtures thereof.

It will be noted that the copolymers described in Examples I and II are prepared by reacting acrylic acid and methyl acrylate using a weight proportion of acrylic acid about four times as great as that of methyl acrylate or a molar ratio of acrylic acid to methyl acrylate within the range of 4:1 to 5:1. These copolymers have a weight average molecular weight within the range of about 6000 to 8000.

From the foregoing evaluation of the products of the invention it will be seen that they are effective as scale inhibitors to inhibit precipitation of both calcium carbonate and calcium sulfate and mixtures thereof and at the same time are not precipitated themselves by calcium ions even at relatively high temperatures and at higher pH's as compared with known scale inhibitors. In general, these compositions are normally used as scale inhibitors at dosages of 0.5 to 100 ppm but certain types of usages may require higher dosages, even as high as 200 to 500 ppm.

The compositions of the invention are especially useful as scale inhibitors in waters containing calcium sulfate and/or calcium carbonate including waterflood systems employed in the secondary recovery of oil and cooling water systems especially once-through cooling systems where hard water is used.

The compositions also have utility in boiler feed waters and in waters charged to certain desalinization equipment where scale deposition is a problem.

The invention can also be used in the prevention of scale deposits in certain effluent and disposal waters, particularly where other materials used in the prevention of such deposits may constitute a pollution problem.

The invention is hereby claimed as follows:

1. A process for preventing scale deposits from the class consisting of calcium sulfate and calcium carbonate and mixtures thereof from water containing said scale forming chemicals and sodium chloride which consists essentially in adding to said water an effective scale inhibiting amount of a copolymer of acrylic acid and methyl acrylate having a molecular weight within the range of 6,000 to 8,000 and obtained by copolymerizing acrylic acid and methyl acrylate using a molar ratio of acrylic acid to methyl acrylate of 4:1 to 5:1, said copolymer of acrylic acid and methyl acrylate being stable at a pH up to at least pH 10 over a period of at least one hour at temperatures of at least 160° F. against precipitation at 1% by weight dosage in a 5% by weight sodium chloride aqueous brine containing 5000 mg/l of calcium, calculated as calcium carbonate.

2. A process as claimed in claim 1 in which said copolymer is added to water in an injection well used to force oil from underground formations to one or more producing wells in a waterflood system.

3. A process as claimed in claim 1 in which said copolymer is added to cooling water containing said scale forming chemicals.

4. A process as claimed in claim 1 in which the calcium concentration in said water is at least 3600 mg/l, calculated as calcium carbonate.

* * * * *